(12) United States Patent
Uchida et al.

(10) Patent No.: US 9,047,282 B2
(45) Date of Patent: Jun. 2, 2015

(54) DOCUMENT MANAGEMENT SYSTEMS, APPARATUSES AND METHODS CONFIGURED TO PROVIDE USER INTERFACE CUSTOMIZED FOR SPECIFIC USER

(75) Inventors: Yuki Uchida, West Caldwell, NJ (US); Shun Tanaka, West Caldwell, NJ (US); Kazuhiko Kato, West Caldwell, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 614 days.

(21) Appl. No.: 12/722,367

(22) Filed: Mar. 11, 2010

(65) Prior Publication Data
US 2011/0225504 A1  Sep. 15, 2011

(51) Int. Cl.
*G06F 7/00* (2006.01)
*G06F 17/30* (2006.01)
*G06Q 30/02* (2012.01)

(52) U.S. Cl.
CPC .... *G06F 17/30011* (2013.01); *G06F 17/30672* (2013.01); *G06F 17/30864* (2013.01); *G06Q 30/02* (2013.01); *G06F 17/30867* (2013.01)

(58) Field of Classification Search
CPC ............... G06F 17/30761; G06F 17/30867; G06F 17/30864
USPC ......................................................... 707/767
See application file for complete search history.

(56) References Cited

U.S. PATENT DOCUMENTS

| | | | |
|---|---|---|---|
| 7,117,247 B2 | 10/2006 | Hyakutake et al. | |
| 7,142,690 B2 | 11/2006 | Hyakutake et al. | |
| 7,149,784 B2 | 12/2006 | Kitada et al. | |
| 7,194,433 B1 | 3/2007 | Hyakutake et al. | |
| 7,227,655 B1 | 6/2007 | Uchida et al. | |
| 7,321,867 B1 | 1/2008 | Uchida et al. | |
| 7,415,441 B1 | 8/2008 | Uchida | |
| 7,599,864 B2 | 10/2009 | Uchida et al. | |
| 7,624,045 B2 | 11/2009 | Uchida et al. | |
| 2004/0104842 A1* | 6/2004 | Drury et al. ............... 342/357.13 |
| 2005/0010475 A1* | 1/2005 | Perkowski et al. ............. 705/14 |
| 2008/0022212 A1* | 1/2008 | Kodimer et al. ............. 715/744 |
| 2008/0034296 A1* | 2/2008 | Bybee et al. ................. 715/741 |
| 2008/0291471 A1 | 11/2008 | Uchida | |
| 2009/0073965 A1* | 3/2009 | Dowling et al. .............. 370/352 |
| 2009/0276413 A1 | 11/2009 | Uchida | |
| 2009/0276771 A1* | 11/2009 | Nickolov et al. ............. 717/177 |
| 2010/0094929 A1* | 4/2010 | Culbertson ................... 709/203 |
| 2010/0095354 A1 | 4/2010 | Uchida et al. | |
| 2010/0131584 A1* | 5/2010 | Johnson ....................... 709/203 |

(Continued)

FOREIGN PATENT DOCUMENTS

JP  2005-208932  8/2005

OTHER PUBLICATIONS

U.S. Appl. No. 12/722,370, filed Mar. 11, 2010.

(Continued)

*Primary Examiner* — Kuen Lu
(74) *Attorney, Agent, or Firm* — Cooper & Dunham LLP

(57) ABSTRACT

Apparatuses, systems and methods are provided for accessing a document management application through a network, wherein user interface information comprising one or more of a plurality of user interfaces customized for a specific user is maintained, and upon successful login of the specific user, said one or more of the plurality of user interfaces are provided for display to the specific user.

20 Claims, 19 Drawing Sheets

(56) References Cited

U.S. PATENT DOCUMENTS

| | | |
|---|---|---|
| 2011/0025715 A1 | 2/2011 | Uchida et al. |
| 2011/0145753 A1* | 6/2011 | Prakash .................. 715/783 |
| 2011/0173270 A1 | 7/2011 | Uchida et al. |

OTHER PUBLICATIONS

U.S. Appl. No. 12/722,374, filed Mar. 11, 2010.
U.S. Appl. No. 12/722,376, filed Mar. 11, 2010.
U.S. Appl. No. 12/722,381, filed Mar. 11, 2010.
U.S. Appl. No. 12/722,370, filed Mar. 11, 2010 of Yuki Uchida et al.
U.S. Appl. No. 12/722,374, filed Mar. 11, 2010 of Yuki Uchida et al.
U.S. Appl. No. 12/722,376, filed Mar. 11, 2010 of Yuki Uchida et al.
U.S. Appl. No. 12/722,381, filed Mar. 11, 2010 of Yuki Uchida et al.
U.S. Appl. No. 12/958,686, filed Dec. 2, 2010 of Shun Tanaka.
U.S. Appl. No. 13/014,384, filed Jan. 26, 2011 of Shun Tanaka.
U.S. Appl. No. 13/036,455, filed Feb. 28, 2011 of Shun Tanaka.
U.S. Appl. No. 13/036,558, filed Feb. 28, 2011 of Shun Tanaka.
U.S. Appl. No. 13/036,644, filed Feb. 28, 2011 of Shun Tanaka.
U.S. Appl. No. 13/036,745, filed Feb. 28, 2011 of Shun Tanaka et al.
U.S. Appl. No. 13/086,608, filed Apr. 14, 2011 of Shun Tanaka et al.
U.S. Appl. No. 13/086,779, filed Apr. 14, 2011 of Shun Tanaka et al.
Japanese official action dated Nov. 18, 2014 in corresponding Japanese patent application No. 2011-054161.

* cited by examiner

Fig. 3

| USER ACCESS INFORMATION |||
|---|---|---|
| USERNAME | BUSINESS RELEVANCY INFORMATION | USER INTERFACE INFORMATION |
| John.Smith | Medical | Medical |
| Jane.Doe | - | General |
| James.Sample | Legal | Legal |
| Julie.Bravo | Legal | Legal - Patent |
| Jim.Alpha | - | Custom JD247 |
| Jeffrey.Oscar | Scientific Financial | Scientific Financial |
| ... | ... | ... |
| ... | ... | ... |
| ... | ... | ... |
| ... | ... | ... |
| ... | ... | ... |

| ACCESS CONTROL INFORMATION ||
|---|---|
| USERNAME | ACESS CONTROL LIST |
| John.Smith | A,B,C |
| Jane.Doe | A,B,C,D |
| James.Sample | E,H,I |
| Julie.Bravo | S,T,U,V,W,X |
| Jim.Alpha | A,T,X |
| Jeffrey.Oscar | B,D,F,G |
| ... | ... |
| ... | ... |
| ... | ... |
| ... | ... |

DOCUMENT MANAGEMENT SYSTEMS, APPARATUSES AND METHODS CONFIGURED TO PROVIDE USER INTERFACE CUSTOMIZED FOR SPECIFIC USER

TECHNICAL FIELD

This disclosure relates to systems, apparatuses and methodologies for managing and exchanging documents and files.

BACKGROUND

In the current information age, information technology (IT) tools for managing files and data are extensively used in enterprises and other organizations, in order to store and transfer electronic documents and data over a network.

A document management system (for example, DocumentMall) can provide users with remote access (that is, through a network) to software applications and related services that would otherwise have to be installed on the user's local computer. For example, such a document management system may be configured to store documents as electronic files in a network-connected (and secure) document storage device, in order to protect the documents from theft or loss and to avoid unnecessarily occupying storage space local to the user computer or local computing environment, while making such files available on demand. The documents may include voluminous and/or sensitive material, and may be configured to provide searchable databases of all forms of legal, medical, financial, educational, scientific, and marketing documents for individuals and/or companies via a network.

Typically, when a conventional document management system receives user input of a request to retrieve a specific document from document storage of the document management system, the document management system transmits an instruction to the document storage based on the user input, and receives data (for the requested document) from the document storage in response to the instruction. The document management system then transmits the data returned from the document storage part to the user. FIG. 1A depicts an example of such a system 100, where client terminals 12-1 through 12-4 may upload and download documents to/from a document storage part of the document management system 15.

There is a drawback, however, in that a user interface of such a conventional document management system is often static and inflexible, with the same set of rigid options presented to all users. This is despite the fact that certain groups of users may be interested in consistently accessing a specific group of services or documents through the document management system.

FIG. 1B depicts an example of a typical static user interface of a conventional document management system. The user interface often provides only basic options for uploading and downloading documents for all users. Moreover, a user is often forced to use a cumbersome explorer-type interface which forces the user to browse through all of the possible options that the universe of users may wish to access, and/or requires the user to drill down several levels (if a hierarchical presentation of such all possible options is presented).

Further, a drawback arises when there is a need or desire to change some aspect of the operation of the document management system or the user interface of the document management system. In such a case, the document management system may need to be taken offline in order to effect the necessary changes, thereby causing great inconvenience to those who wish to, but cannot, use the document management system while the system is offline.

There exists a need for an improved document management system which is not as difficult and time-consuming to use.

SUMMARY

This disclosure provides tools (in the form of systems, apparatuses, methodologies, computer program products, etc.) for managing and accessing documents or files.

In an aspect of this disclosure, the tools can make available any of plural user interfaces, and for each of plural registered users, user access information is maintained, and for each of the registered users, such user access information includes user interface information that identifies one or more of the plural user interfaces that would be suitable for the registered user. Such user interface information is preferably retrieved upon login by the user (for example, user information from user login is utilized to retrieve the user interface information registered for the specific user), and an appropriate user interface that is suitable to the user is presented to the user without requiring the user to select the user interface he or she wishes to use.

In another aspect of this disclosure, one or more user interfaces provided for display on a client terminal communicate, when user input is received through the one or more of the user interfaces, with an application program interface of a document management application, and send a command, corresponding to the user input and acceptable to the document management application, to the document management application to access one or more corresponding application functionalities of the document management application, corresponding to the user input.

In another aspect of this disclosure, at least one of document and other information is received from an application program interface of a document management application, in response to a command transmitted from an application interface part to the document management application, and the document or other information is provided for access by a specific user.

In another aspect of this disclosure, a user interface part is distinct from a document management application, and the user interface part is reconfigurable without taking the document management application offline.

In another aspect of this disclosure, user access information includes business relevancy information indicating a specific business relevancy field pertinent to a registered user, and one or more user interfaces provided for display on a client terminal display information corresponding to the specific business relevancy field pertinent to the specific user. Further, the user interface may include user interface activators to access application functionalities corresponding to a specific business relevancy field pertinent to the specific user.

BRIEF DESCRIPTION OF THE DRAWINGS

The above-mentioned and other features, aspects and advantages can be more readily understood from the following detailed description with reference to the accompanying drawings wherein:

FIG. 3 shows an example of user access information;

FIGS. 5A and 5B show examples of user interfaces provided for display on a client terminal;

FIG. 10 shows an example of access control information;

DETAILED DESCRIPTION

Figure 1A:
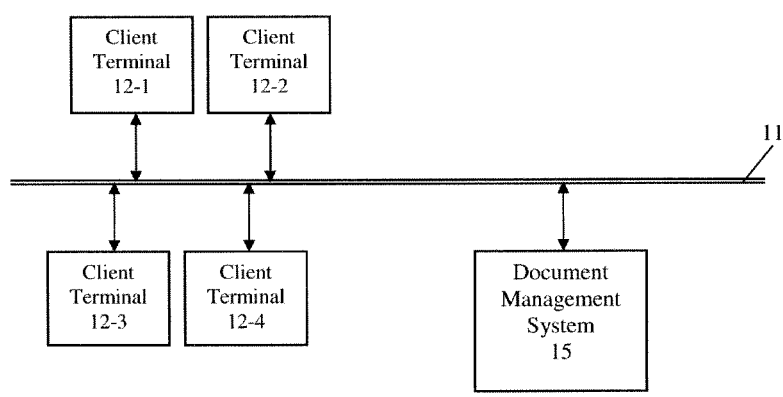
FIG. 1A shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations have been omitted when it may obscure the subject matter of the present invention.

Referring now to the drawings, wherein like reference numerals designate identical or corresponding parts throughout the several views, FIG. 2A shows schematically a system 200 for managing and exchanging documents and files, according to an exemplary embodiment of this disclosure.

System 200 includes a plurality of client terminals 12-1 through 12-4, a document management apparatus 25, and a document access apparatus 27 (or also referenced herein as "application user interface apparatus"), all of which are interconnected by a network 11.

Figure 1B:
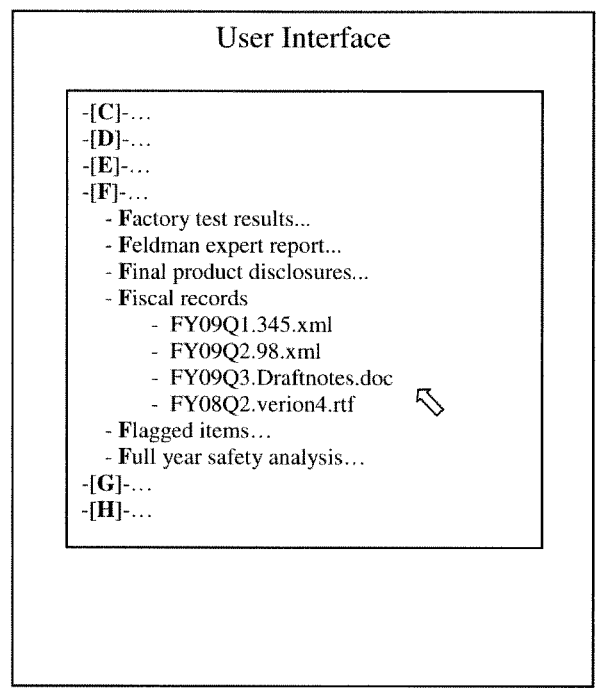
FIG. 1B shows a user interface of a conventional system.

The plurality of client terminals 12-1 through 12-4 may be substantially similar to those depicted in FIG. 1. In particular, the client terminals 12-1 through 12-4 are configured with software allowing the client terminals to communicate through the network with at least the document access apparatus 27 and preferably also the document management apparatus 25. In particular, the client terminals 12-1 through 12-4 may transmit data to—and receive data from—the document access apparatus 27.

The document management apparatus 25 may be configured to execute a document management application having a plurality of application functionalities, the plurality of application functionalities including a document registration function to register a specified document in a document database, and a search function to search the document database based on specified terms. The document management apparatus 25 may be also referenced herein as "document management application".

Document access apparatus 27 includes a user information maintenance part 27a, and a user interface part 27b.

The user information maintenance part 27a is configured to maintain user access information for a plurality of registered users. FIG. 3 depicts an example of user access information, and it is discussed in greater detail infra. The user access information for each registered user may include user interface information registering one or more of a plurality of user interfaces for each registered user.

The term user interface is used to refer to the type of interface that is provided for display to a user to allow the user to access the application functionalities of the document management apparatus 25. Examples of user interfaces are depicted in FIGS. 4A through 4D which are discussed in greater detail infra, and may include a medical user interface, legal user interface, scientific user interface, financial user interface, accounting user interface, general user interface, custom user interface, and so on. Note that one or more of the user interfaces may be provided as web services through the network to the client terminal.

The user interface part 27b is configured to receive user information from a specific user of a client terminal when that user logs into the document access apparatus 27. The user information may be any information transmitted by a user to the document access apparatus 27 for the purposes of login and authentication, such as a username and password. User information is not limited to usernames and passwords, but may also include information such as email addresses, screen names, telephone numbers, facsimile numbers, and biometric information (fingerprints, palm prints, voice or speech, retinas or irises, facial expressions or features, signature, etc.).

The user interface part 27b is also configured to retrieve the user interface information registered for the specific user. With reference to FIG. 3, the user interface part 27b refers to the user access information for the specific user maintained by the user information maintenance part 27a, and determines the user interface information registered for the specific user. In this way, the user interface information registered for the specific user is retrieved from the user access information maintained by the user information maintenance part 27a.

Further, the user interface part 27b is also configured to determine the user interface(s) registered for the specific user, based on the retrieved user interface information. The user interface part 27b provides the user interface(s) registered for the specific user for display on a client terminal.

Referring to the user access information of FIG. 3, if the user interface part 27b receives user information indicating the username John.Smith, then the user interface part refers to the user access information for the username John.Smith and retrieves the respective user interface information for the username John.Smith, which in this case identifies the medical user interface. Thereafter, the user interface part 27b provides the respective user interface (i.e. the medical user interface) for display on a client terminal for the registered user John Smith to view.

Thus, according to this exemplary embodiment of the present invention, there is provided the tools for the efficient exchange and management of documents and files. Whereas conventional techniques typically only provide a single interface for all users of a document management apparatus, the system of the present application automatically determines a user interface most appropriate for a logged-in user, and provides the user interface for display to the user. Hence, the operational convenience to users of the present invention is greatly increased.

For example, medical professionals may wish to upload and access documents such as patient records, patient billing, medical procedure manuals, test results, and so forth. On the other hand, legal professionals may wish to access information such as memorandums, briefs, case law, client records, client billing, and so forth. Accordingly, this disclosure allows a different user interface (such as a medical user interface or a legal user interface) to be made available for each particular user. Further, the user interface for each user can change over time, without affecting the operation of the document management apparatus with respect to other users. Each user interface may be one of a plurality of pre-defined types, may be modifiable based on a general template, or may be completely customized.

The document access apparatus 27 may be embodied as a server that is separated and physically distinct from the document management apparatus 25. In this way, the document access apparatus 27 may correspond to a first server, and the document management apparatus 25 may correspond to a second server separate and distinct from the first server. Hence, while conventional document management systems typically have an integrated user interface, such that any modification of the user interface would require taking the document management system offline, the document access apparatus of this disclosure is configured for modification without taking the document management apparatus offline.

Figure 6:
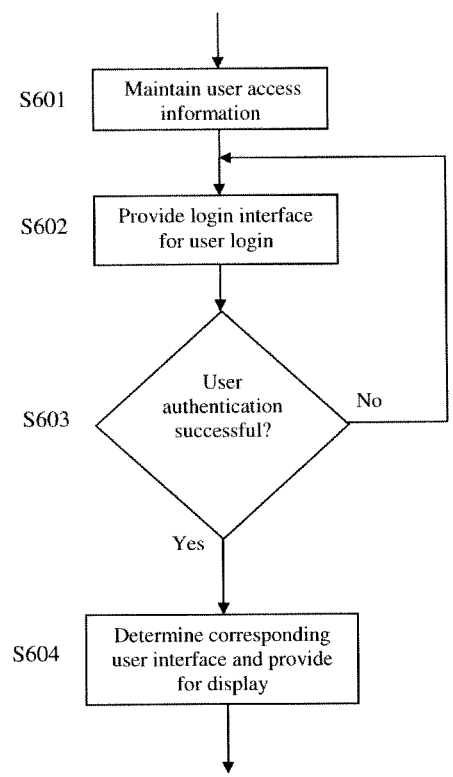
FIG. 6 shows a flow chart of a workflow on a document access apparatus (or application user interface apparatus) side, in an exemplary embodiment.

In FIG. 6, a flow chart is shown illustrating an example of a workflow on a document access apparatus side (such as the document access apparatus 27 in FIG. 2A).

Firstly, in S601 the document access apparatus maintains user access information for a plurality of registered users. The user access information for each registered user may include user interface information registering one or more of a plurality of user interfaces for the registered user. FIG. 10 depicts an example of user access information, as discussed earlier.

Then, in S602 the document access apparatus provides a login interface through a network to a client terminal for user login. The document access apparatus also receives user information when a specific client user logs into the document access apparatus. User information may include information such as usernames, email addresses, passwords, screen names, telephone numbers, facsimile numbers, and biometric information (fingerprints, palm prints, voice or speech, retinas or irises, facial expressions or features, signature, etc.).

Thereafter, the document access apparatus attempts to authenticate the user based on the received user information, and determines whether the user has been properly authenticated (S603). If the user has been properly authenticated (S603, yes), than processing proceeds to S604. If the user has not been properly authenticated (S603, No), then the document access apparatus waits for another attempt by a user to login.

In S604, the document access apparatus analyzes the user information, and determines the corresponding user interface for the user, based on the user information received in S602 and the maintained user access information. Specifically, the document access apparatus utilizes the user information to retrieve the user interface information registered in the user access information for the specific user. The document access apparatus then provides the corresponding user interface registered for the specific user, for display on a client terminal.

As discussed earlier, FIG. 3 shows an example of user access information for each one of a plurality of registered users, such as users of client terminals 12-1 through 12-4. The user access information includes a plurality of usernames (representing the users of the plurality of client terminals), and user interface information identifying user interfaces corresponding to the respective usernames.

For example, for the username John.Smith the corresponding user interface is the medical user interface, and for the username James.Sample the corresponding user interface is the legal user interface. Other available user interfaces may include a scientific user interface, a financial user interface, an accounting user interface, a marketing user interface, and so forth. Also note that various modifications and subtypes are available for each of these broad user interfaces. For example, while there is a legal user interface, it is also possible to have a legal-patent user interface (as shown in FIG. 3), as well as legal-real estate user interface, legal-labor user interface, legal-litigation user interface, etc. . . . . . Further, there may be a general (or default) user interface with basic functionality, and a custom (or personalized) user interface.

It is possible for more than one user interface to correspond to a user. For example, two (or more) user interfaces may be registered for a user (e.g., in the case of Jeffrey Oscar, a scientific user interface and a financial user interface).

As shown in FIG. 3, the user access information may also include business relevancy information indicating a specific business relevancy field pertinent to the registered user, and the user interfaces may display information corresponding to the specific business relevancy field pertinent to the specific user.

The user access information contained within the user access information table is not limited to that shown in FIG. 3, which merely presents an example. In particular, while the user access information shown FIG. 3 includes usernames, business relevancy information and user interface information, the user access information can instead (or in addition) store various other information, including information that may be used to identify a user of a client terminal that may be in communication with a document management apparatus. For example, the user access information can include a plurality of names and/or screen names, email addresses, telephone numbers, facsimile numbers, etc. The user access information may include biometric information (such as fingerprints, palm prints, voice or speech, retinas or irises, facial expressions or features, signature, etc).

FIGS. 4A through 4D depict examples of user interfaces as they are provided for display on a client terminal, according to an exemplary embodiment of this disclosure.

Figure 4A:
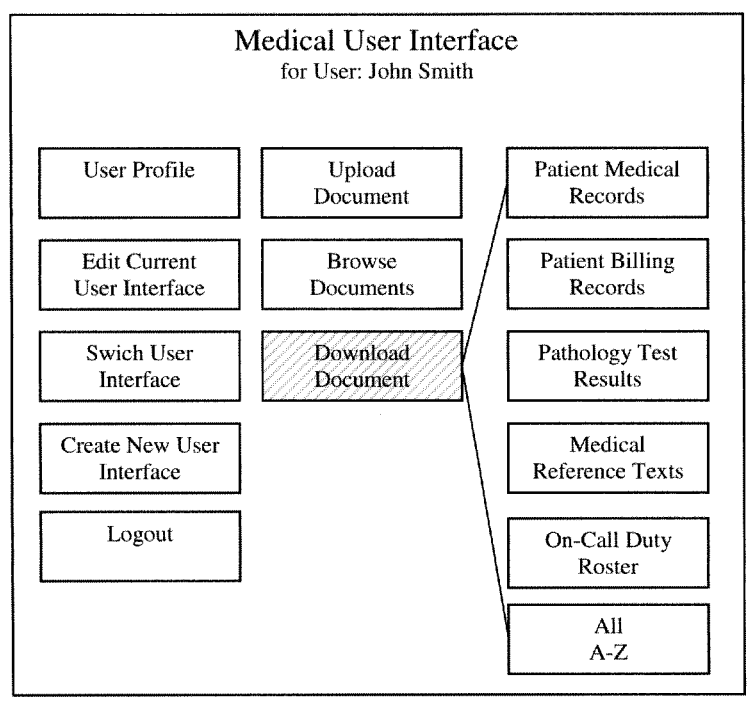
FIGS. 4A through 4D show examples of user interfaces provided for display on a client terminal.

FIG. 4A depicts an example of medical user interface as it is provided for display. For example, this is a user interface that may correspond to the user John Smith, based on the user access information in FIG. 3. This medical user interface includes a number of options:

User Profile—Allowing the user to access and edit basic aspects of their profile, such as username, password;

Edit Current User Interface—Allowing the user to edit aspects of the current user interface (in this case, the Medical User Interface);

Switch User Interface—Allowing the user to switch to another user interface, such as another user interface already identified in the user access information of that user;

Create New User Interface—Allowing a user to create/select a new user interface;

Logout—Allowing the user to logout of the user interface;

Upload Document—Allowing the user to upload a document to the document management apparatus;

Browse Documents—Allowing the user to browse the documents in the document management apparatus;

Download Document—Allowing the user to download a document from the document management apparatus.

Further, FIG. 4A depicts some of the customizable user interface options, or user interface 'activators', that are presented when a user clicks on the 'Download Document' button. The activators may be unique to the medical user interface, and may include options for downloading patient medical records, patient billing records, pathology test results, medical reference texts, on-call duty roster, and so forth. It should be understood that such options are merely exemplary, and these options may be customized according to this disclosure.

Thus, the user interfaces provided for display on the client terminal include one or more user interface activators configured to transmit, when the activator is selected or activated by the user, a corresponding command to the document management apparatus to access one or more corresponding application functionalities of the document management apparatus.

Figure 4B:
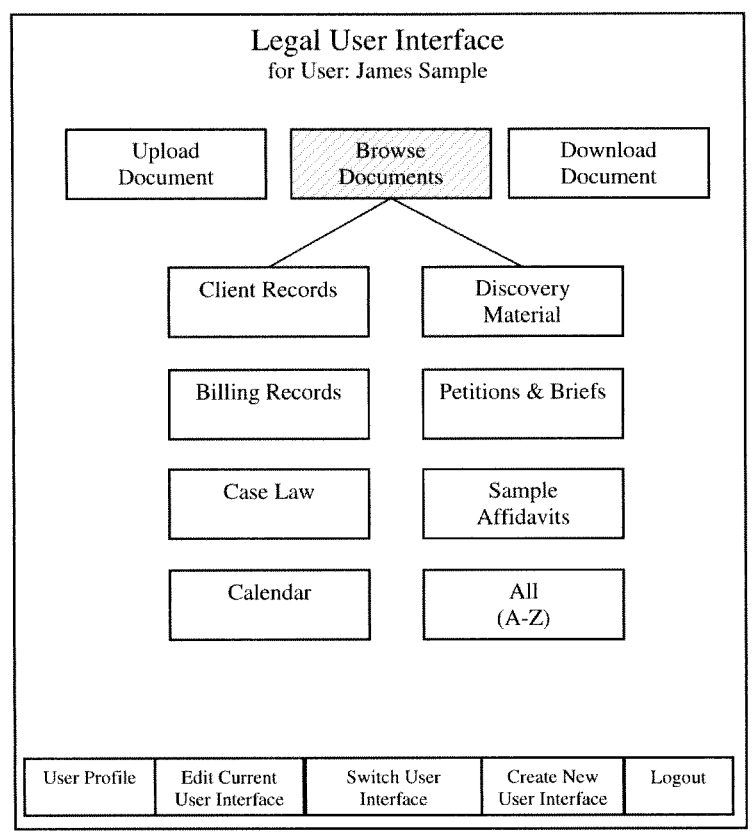

FIG. 4B depicts an example of a legal user interface as it is provided for display. Note that this is a user interface that may correspond to the user James Sample, based on the user access information in FIG. 3.

Many of the options in the legal user interface are similar to those in the medical user interface, including: User Profile, Edit Current User Interface, Switch User Interface, Create New User Interface, Logout, Upload Document, Browse Documents, and Download Document.

Further, FIG. 4B depicts some of the customizable user interface activators that are presented when a user clicks on the 'Browse Documents' button. The user interface activators may be unique to the legal user interface, and include options for downloading client records, billing records, legal case law, calendar entries, discovery material, petitions and briefs, and sample affidavits. It should be understood that such options are merely exemplary, and these options may be customized according to this disclosure. Further, even the layout, background, button sizes, etc. . . . differ between user interfaces, and can be customizable.

Figure 4C:
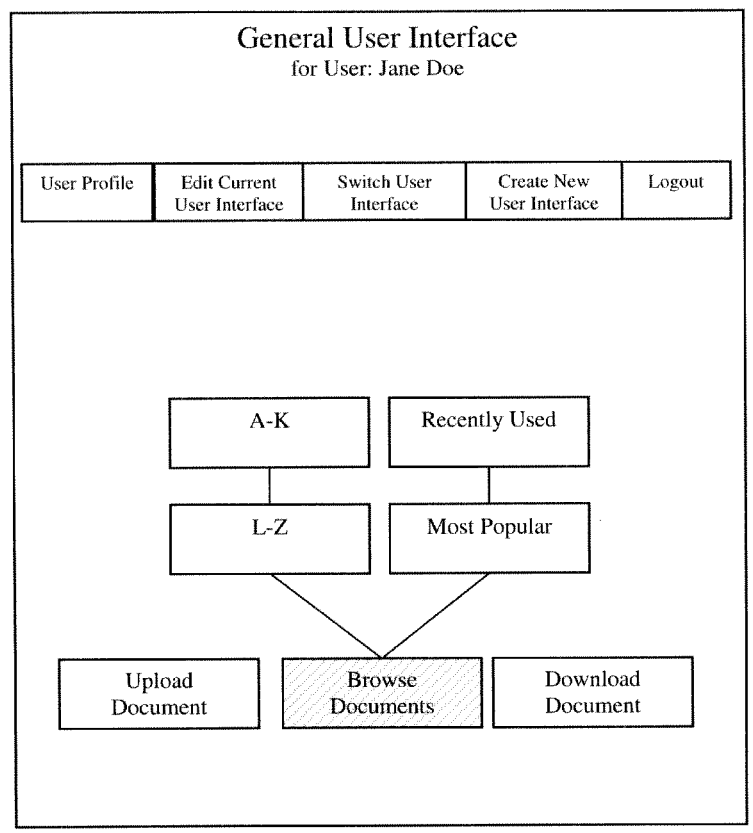
Figure 4D:
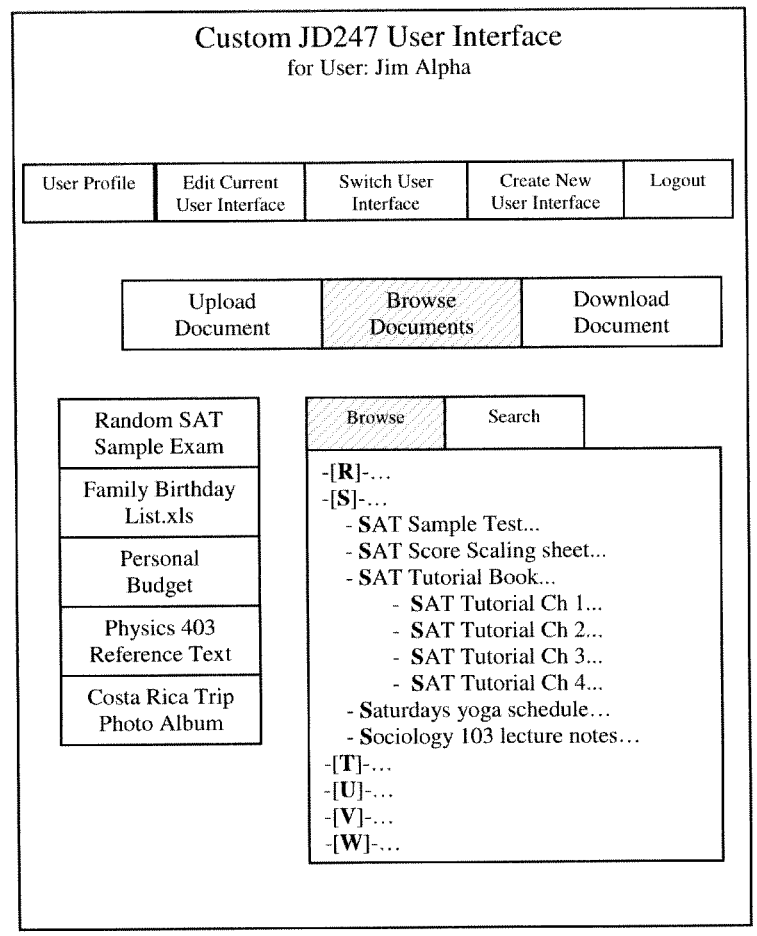

Similarly, FIGS. 4C and 4D present further examples of user interfaces according to this disclosure.

FIG. 4C depicts a general user interface as it is presented to a user. For example, this is a user interface that may correspond to the user Jane.Doe, based on the user access information in FIG. 3. User interface activators for the general user interface include browse Recently Used, browse Most Popular, browse A-K and browse L-Z.

FIG. 4D depicts a custom user interface that has been customized for a particular user. For example, this is a user interface 'Custom JD247' that may correspond to the user Jim.Alpha, based on the user access information in FIG. 3. Further, the activators, layout, background, etc., may be highly customized.

Figure 5A:
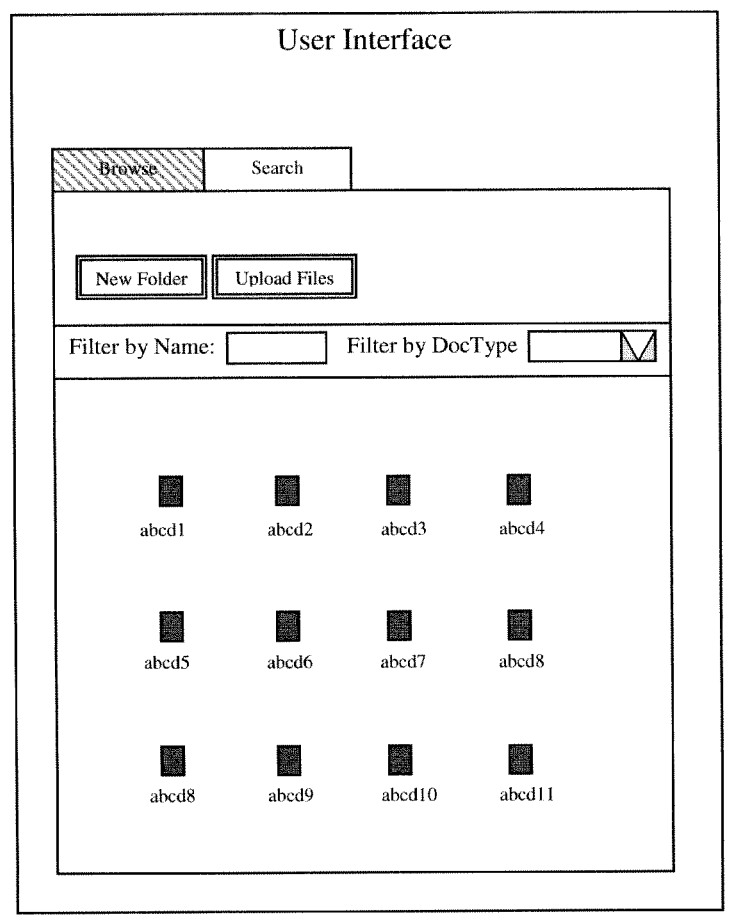

FIG. 5A depicts another example of a user interface screen, provided when a user clicks a 'browse' button, such as the browse button shown in FIG. 4D. The user interface of FIG. 5A allows the user to browse through folders that may correspond to document databases. The user interface also allows the user to filter the folders by name, and filter by document type (for example, sales document, invoice, resume, etc.).

Figure 5B:
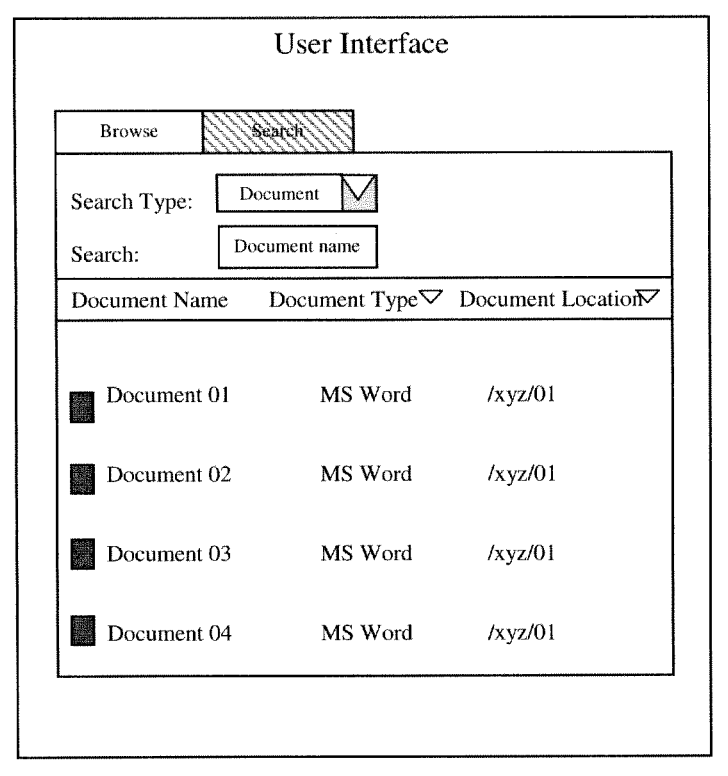

Similarly, FIG. 5B depicts another example of a user interface screen, provided when a user clicks a 'search' button, such as the search button shown in FIG. 4D. The user interface allows the user to search for documents by key terms (such as "document name") and also control the type of the search (i.e. a 'document' type search involves a search for only documents, a 'folder' type search involves a search for only folders, etc.).

Figure 7A:
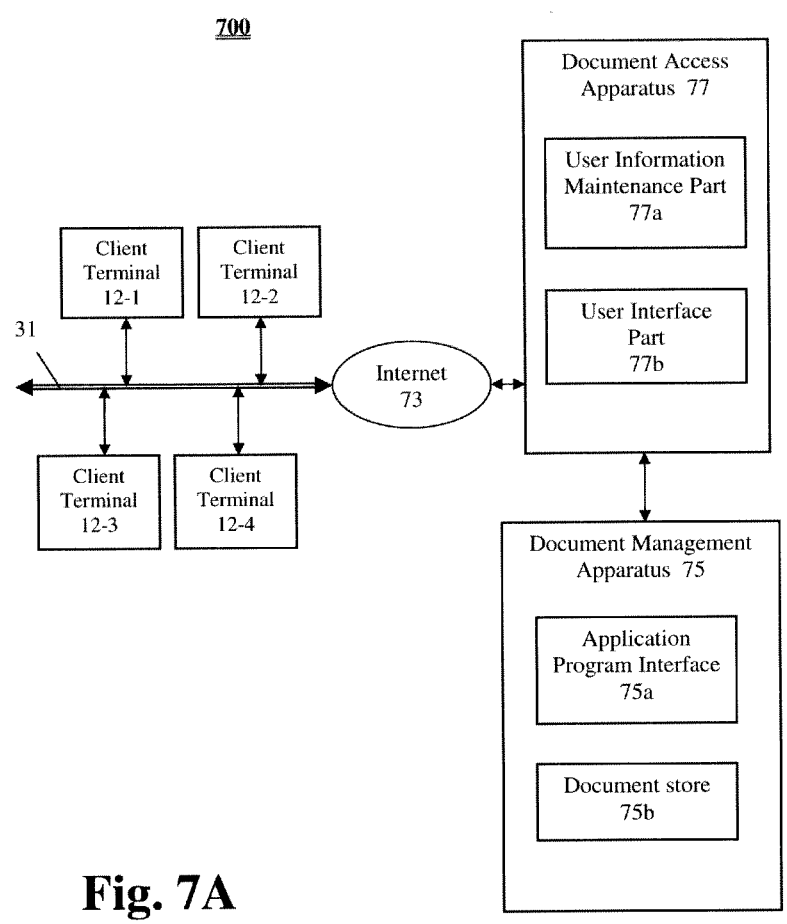
FIG. 7A shows a block diagram of a system, according to another exemplary embodiment of this disclosure.

Turning now to FIG. 7A, there is shown schematically a system 700 for providing document management services to a client terminal over a network, according to another exemplary embodiment of this disclosure.

System 700 includes a plurality of client terminals 12-1 through 12-4, a document management apparatus 75, and a document access apparatus 77.

Figure 2:
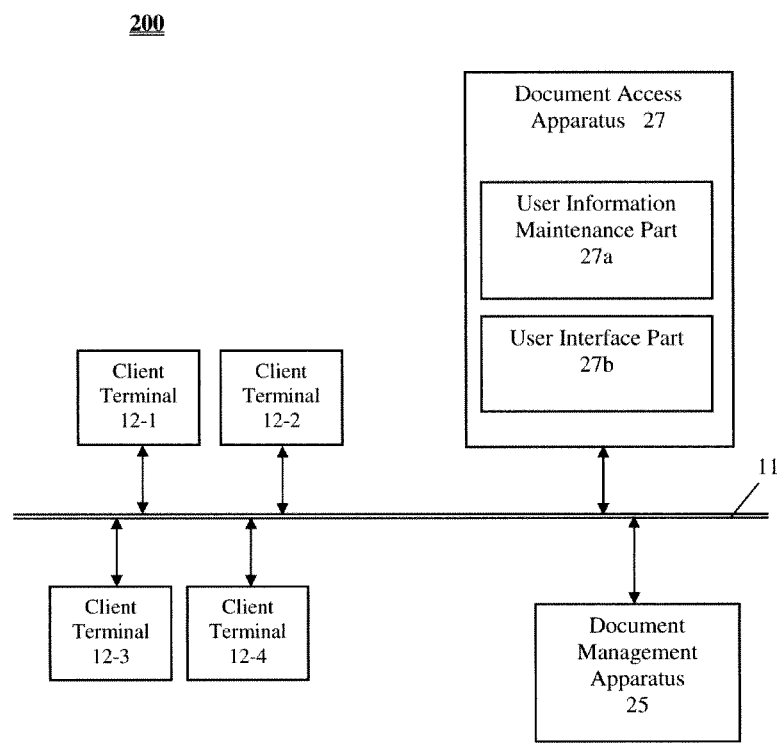
FIG. 2 shows a block diagram of a system, according to an exemplary embodiment of this disclosure.

The plurality of client terminals 12-1 through 12-4 may be substantially similar to those of FIG. 2.

The document management apparatus 75 may execute a document management application substantially similar to a document management application operating on the document management apparatus 25 of FIG. 2A.

Document management apparatus 75 includes an application program interface 75a, and a document store 75b.

The application program interface 75a is configured to specify a format of communication with the document management apparatus 75.

Hence, the application program interface 75a is similar to the application programming interfaces (APIs) known in the art, which are interfaces often implemented in software that specify the commands and instructions that an application or device may be configured to accept. In this way, the application program interface 75a of the document management apparatus 75 may include specifications for routines and protocols that are to be used when communicating with the document management apparatus 75 or requesting the application functionalities of the document management apparatus (such as uploading, accessing and downloading documents).

The document store 75b is configured to store documents and other data or information.

The document access apparatus 77 includes a user information maintenance part 77a and a user interface part 77b.

The user information maintenance part 77a of the document access apparatus 77 is configured to maintain user access information for a plurality of registered users.

FIG. 3 depicts an example of user access information. The user access information for each one of the plurality of registered users includes user interface information registering one or more of a plurality of user interfaces for the registered user.

The user interface part 77b is configured to provide a login interface through the network to one of the client terminals, receive user information from login of a specific user of the client terminal, utilize the user information to retrieve the user interface information registered for the specific user, and provide the user interfaces registered for the specific user, for display on the client terminal.

In particular, the user interface part 77b refers to the user access information for the specific user maintained by the user information maintenance part 77a, and determines the user interface information registered for the specific user. In this way, the user interface information registered for the specific user is retrieved from the user access information maintained by the user information maintenance part 77a.

The document access apparatus 77 is further configured to communicate, when user input is received through the one or more of the user interfaces, with the application program interface 75a of the document management apparatus 75, receive information from the application program interface 75a specifying the format of communication with the document management application 75, and send a command, corresponding to the user input and in the format specified by the application program interface 75a, to the document management application 75 to access one or more corresponding application functionalities of the document management application.

The document access apparatus 77 receives, in response to the command transmitted to the document management application 75, at least one document (or other information)

from document management application 75, and provides the document or other information for access by the specific user on the client terminal.

Recall that system 200 in FIG. 2 shows the plurality of client terminals 12-1 through 12-4, the document access apparatus 27 and the document management apparatus 25 all directly connected to the network 11. In contrast, system 700 shows that the plurality of client terminals are directly connected to a first network 71, which may be a local area network (LAN) or intranet internal to an enterprise organization. This first network 71 is then connected to the document access apparatus 77 via a second network 73 such as the internet. The document access apparatus 77 and the document management apparatus 75 executing the document management application may be connected to each other through the Internet or another network, or may be parts configured within a single device or apparatus, for example.

Figure 7B:
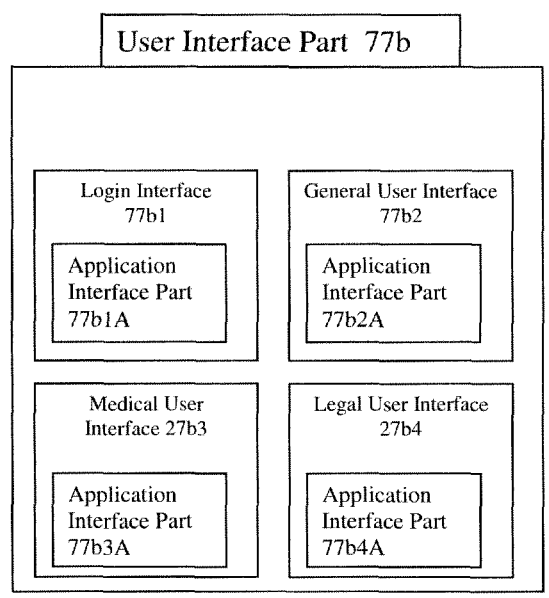
FIG. 7B shows a user interface part in greater detail.

FIG. 7B shows, by way of example, a more detailed representation of aspects of the user interface part 77*b* of the document access apparatus 77 depicted in FIG. 7A. In particular, the user interface part 77*b* may include a number of user interfaces 77*b*1 through 77*b*4, such as a login interface 77*b*1, a general user interface 77*b*2, a medical user interface 77*b*3 and a legal user interface 77*b*4.

Further, each of the user interfaces 77*b*1 through 77*b*4 in the user interface part 77*b* can include an application interface part (77*b*1A through 77*b*4A, respectively).

Each application interface part is configured to communicate with the application program interface 75*a* of the document management apparatus 75, when user input is received at the corresponding user interface. The user input may be a request to upload/download a document to/from the document management apparatus, or a request to access some other application functionality of the document management apparatus. Each application interface part is also configured to send a command, corresponding to the user input and acceptable to the document management apparatus 75, to the document management apparatus to access one or more corresponding application functionalities of the document management apparatus.

Specifically, when the application interface part communicates with the application program interface 75*a* of the document management apparatus 75, the application interface part determines a set of possible instructions that the document management apparatus is able to accept. Based on this set of possible instructions, the application interface part prepares a command or set of commands corresponding to the user input that the document management apparatus is able to accept, and transmits this command to the document management apparatus.

For example, if the user input is a request to download all instances of a certain type of document (such as a spreadsheet or a presentation document) that is known to be associated with a certain file format (such as .xml or .ppt), then the application interface part communicates with the application program interface 75*a* of the document management interface 75, in order to determine the protocols for requesting documents of a specific file format from the document management apparatus. The application interface part can then prepare and transmit the appropriate command that is acceptable to the document management apparatus.

The application interface part is also configured to receive at least one document or other piece of information from the application program interface 75*a* of the document management apparatus 75, in response to the command transmitted from the application interface part to the document management apparatus 75. Following this, the corresponding user interface 77*b*1 through 77*b*4 provides the document or other information for access by the specific user.

Thus, the document access apparatus 77 of this disclosure has the capacity to receive user input from one of a plurality of user interfaces, and send a command corresponding to the user input to a document management apparatus to access an application functionality of the document management apparatus, where the command is prepared so as to be acceptable to the document management apparatus. Since the document access apparatus 77 prepares the command by communicating with an application program interface 75*a* of a document management apparatus 75, the document access apparatus 77 becomes highly flexible and has the capacity to communicate with a plurality of different document management apparatuses.

Figure 8A:
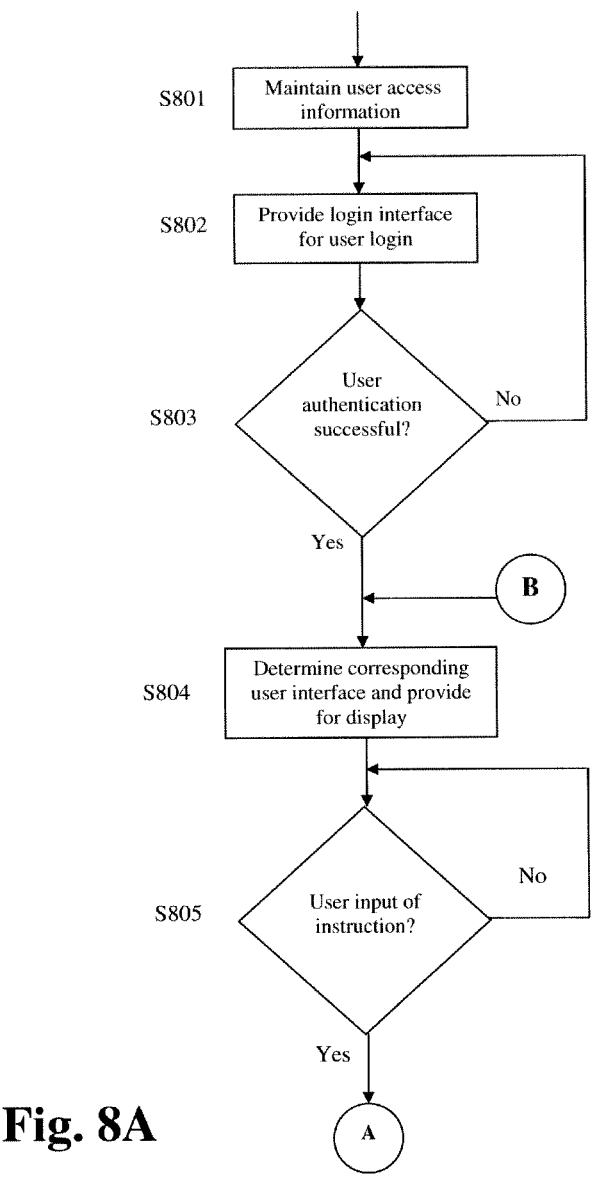
FIGS. 8A and 8B show a flow chart of a more detailed workflow on a document access apparatus (or application user interface apparatus) side, in another exemplary embodiment.
Figure 8B:
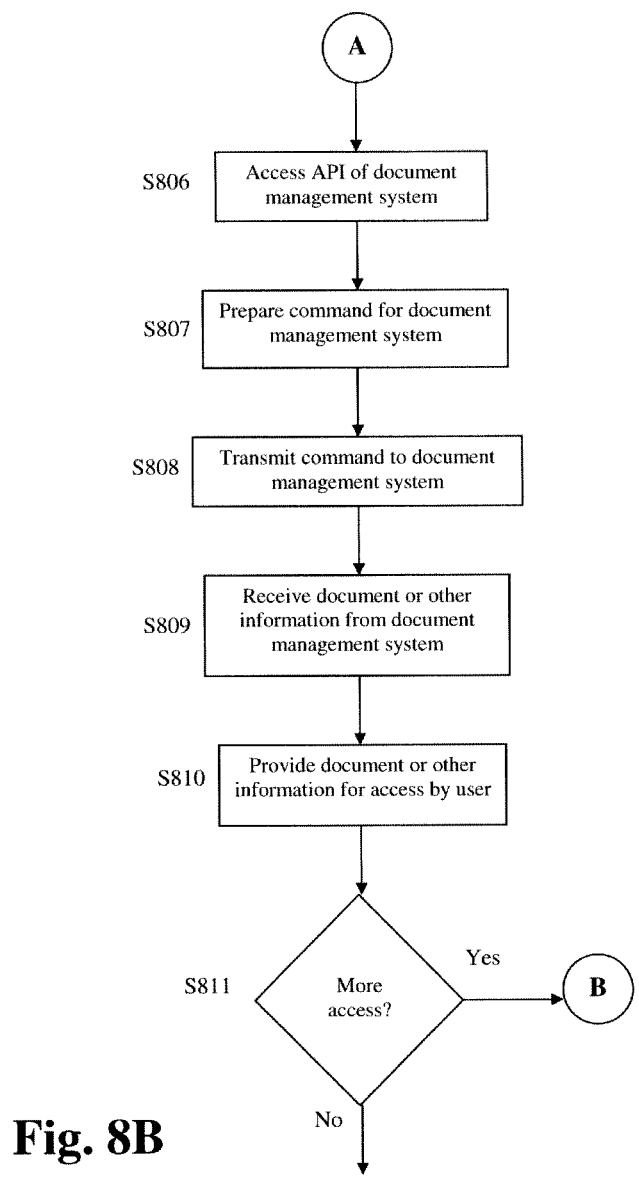

In FIGS. 8A and 8B, a flow chart is shown illustrating an example of a more detailed workflow on a document access apparatus side (such as the document access apparatus 77 in FIG. 7A).

Steps S801 through S804 are substantially similar to steps S601 through S604 of FIG. 6.

After providing the corresponding user interface for display to the user (S804), the user may input instructions requesting the document access apparatus and/or document management apparatus to perform a particular operation. For example, the user may issue an instruction (using the available user interface activators of the corresponding user interface) for the document access apparatus to upload a particular document or file to the document management apparatus. The user may also input an instruction for the document access apparatus to edit a document stored at the document management apparatus, or to retrieve at least some portion of a document stored at the document management apparatus, for example.

In S805, the document access apparatus determines whether the user has inputted such an instruction. If the document access apparatus determines that the user has inputted an instruction (s805, yes), then processing proceeds to step S806. If the document access apparatus determines that the user has not inputted an instruction (s805, no), then the document access apparatus continues to wait for the user to input such an instruction.

In S806, the document access apparatus accesses the application program interface (API) of the document management apparatus in order to determine the set of possible instructions that the document management apparatus is able to accept. In S807, the document access apparatus determines the appropriate command to be issued to the document management apparatus, based on the user instructions received in S805 and the set of possible instructions determined in S806. In this way, the document access apparatus may convert the user instruction into a command that the document management apparatus is able to accept. For example, the document access apparatus may convert an instruction for a particular medical document into a request for files with an attribute that the document management apparatus can process. The document access apparatus transmits the command to the document management apparatus in S808.

In S809 the document access apparatus receives from the document management apparatus the image data of a document or some other information, in response to the command transmitted in S808.

After receiving the document or other information in S809, the document access apparatus provides the document or other information received from the document management apparatus to the logged-in user, for display on a client terminal (S810).

Thereafter, the document access apparatus determines if the user wishes to issue further instructions for the document access apparatus or the document management apparatus (S811). If it is determined that the user wishes to issue further instructions (s811, yes), then the document management apparatus returns to S804 in order to display the user interface most appropriate for the user, as discussed above. If it is determined that the user does not wish to issue any further instructions to the document management apparatus (s811, no), then the process ends.

Figure 9:
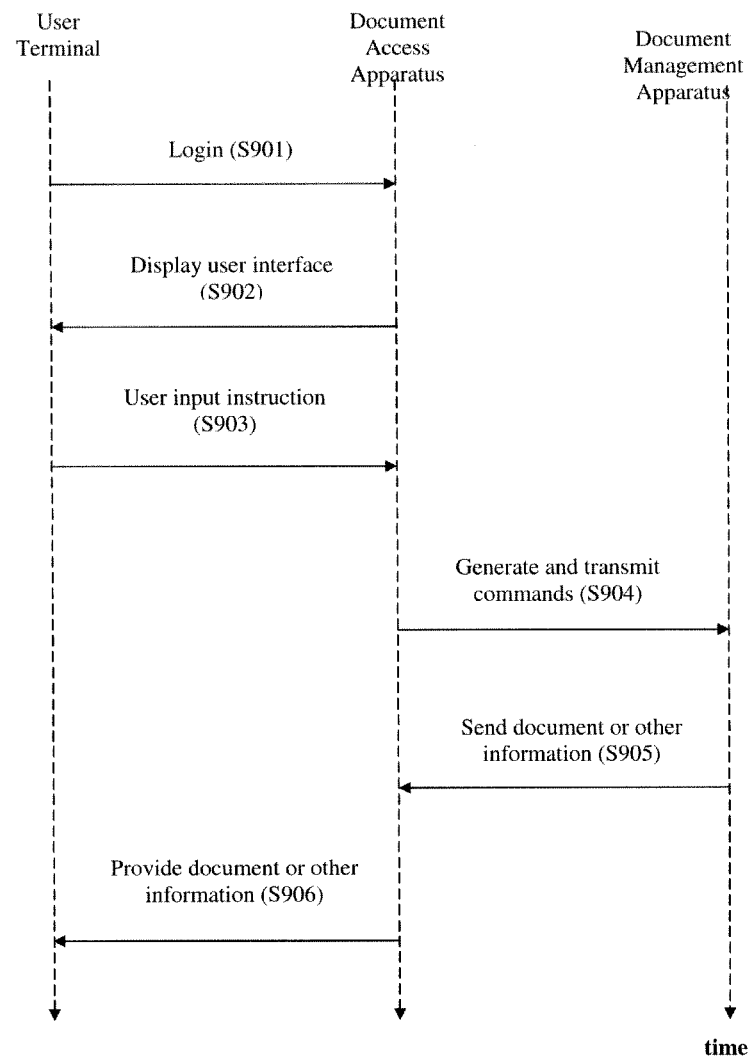
FIG. 9 shows a schematic view of an example of data flow in an exemplary embodiment.

Turning now to FIG. 9, a schematic view of an example of data flow in an exemplary embodiment is presented.

Firstly, a client user logs into a document access apparatus (S901). The client logs into the document access apparatus by transmitting user information to the document access apparatus. As discussed above, user information may include information such as usernames, email addresses, passwords, screen names, telephone numbers, facsimile numbers, and biometric information (fingerprints, palm prints, voice or speech, retinas or irises, facial expressions or features, signature, etc.).

After the document access apparatus authenticates the user based on the user information received in S901, the document access apparatus determines the corresponding user interface for the user, based on the user information and user access information maintained by the document access apparatus, and provides the appropriate user interface for display to the user (S902).

Following the display of the appropriate user interface to the user, the user transmits an input instruction to the document access apparatus (S903). For example, the user may issue an instruction (using the available user interface activators of the corresponding user interface) for the document access apparatus to upload a particular document or file to the document management apparatus. The user may also input an instruction for the document access apparatus to edit a document stored at the document management apparatus, or to retrieve at least some portion of a document stored at the document management apparatus.

In S904, the document access apparatus generates and transmits a command to the document management apparatus, based on the input instructions received from the user in S903. In particular, the document access apparatus accesses the application program interface of the document management apparatus in order to determine a set of possible instructions that the document management apparatus is able to accept. In this way, the document access apparatus may convert the user instruction into a command that the document management apparatus is able to accept.

In response to the command transmitted in S904, the document management apparatus transmits data to the document access apparatus (S905). The data may include image data of a document that the user is attempting to retrieve, for example, or some other information.

Finally, after receiving the data or other information in S905, the document access apparatus transmits and displays the received data to the user (S906). In particular, if the data is image data of a document being retrieved, then the document access apparatus performs any formatting or rendering of the image data that may be necessary in order to properly display the requested document to the user.

According to another exemplary embodiment of this disclosure, the application interface part is also configured to communicate at least some of the user information from the login of the specific user to the document management apparatus 75 or 25). Thereafter, the document management apparatus 75 (or 25) determines, based on the user information and access control information maintained by the document management apparatus, documents and other information which the user is permitted to access. Thus, the security features of the document management apparatus are greatly increased.

FIG. 10 depicts an example of access control information, which may be maintained in the document store 75b of the document management apparatus 75. The access control information identifies a plurality of registered users of the document management apparatus 75, and the corresponding documents or data that the user is permitted to access. For example, the registered user John.Smith is permitted to access the documents 'A', 'B' and 'C', the registered user Jane.Doe is permitted to access the documents 'A', 'B', 'C' and 'D', the registered user Jeffrey.Oscar is permitted to access the documents 'B', 'D', 'F' and 'G', and so on.

Figure 11:
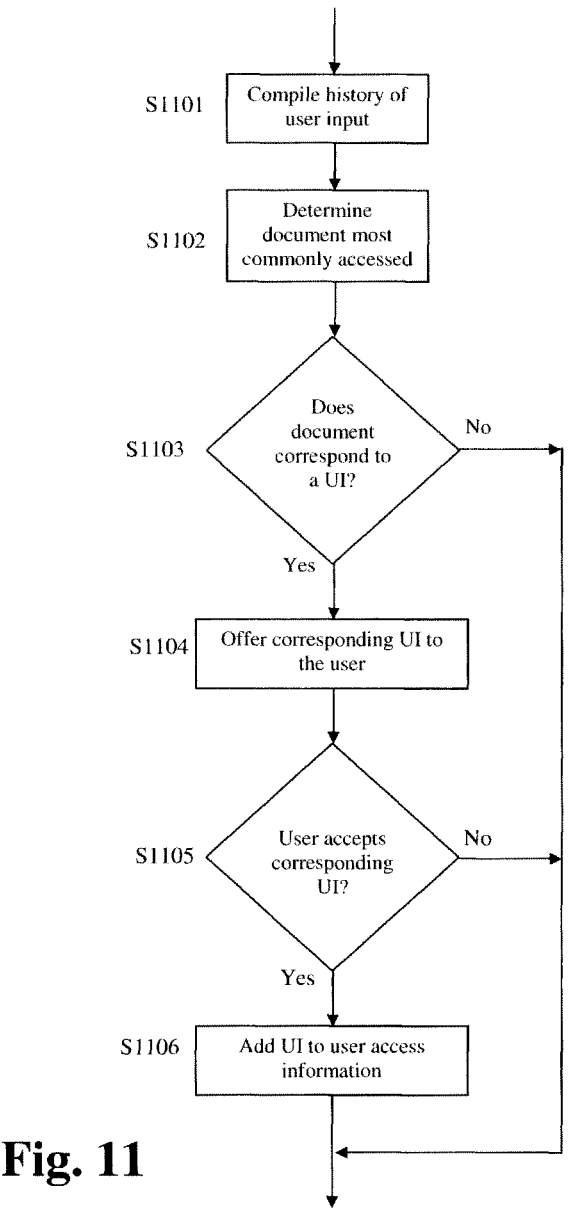
FIG. 11 shows a flow chart of a workflow on a document access apparatus (or application user interface apparatus) side, when a user wishes to edit a current user interface or create a new user interface, in another exemplary embodiment.

Turning now to FIG. 11, a flow chart illustrates an example of a workflow on a document access apparatus side when a user wishes to edit a current user interface or create a new user interface, according to another exemplary embodiment of this disclosure.

When a user indicates their desire to edit their current user interface or create a new user interface (by selecting the 'Edit Current User Interface' or 'Create New User Interface' buttons, in each of the user interfaces shown in FIGS. 4A through 4D for example), the document access apparatus compiles a history of previous user actions with respect to the operation of the user interface (S1101). For example, the document access apparatus may compile a list of all the user input instructions requesting upload of a document to a document management apparatus (or requesting the retrieval of document from a document management apparatus).

Thereafter, the document access apparatus determines the document or types of documents most commonly accessed by the user (S1102). For example, the document access apparatus examines the list of compiled user input instructions, and determines the document or types of documents most commonly retrieved from or uploaded to the document management apparatus.

Then the document access apparatus determines whether the above-mentioned document or types of documents correspond to a particular user interface (S1103). For example, if the document access apparatus determines that the document is a legal petition, legal brief or case law information (based on the file name, file extension, folder storage location of the document, etc. . . . ), then the document access apparatus determines that the document corresponds to the legal user interface.

A manner in which a legal user interface is provided for display on a client terminal is depicted, by way of example, in FIG. 4B. For example, some of the user interface activators such as 'Case Law', and 'Petitions and Briefs', allow a user to access the corresponding types of documents from the document management apparatus. Thus, the user may find the legal user interface useful, since it is the case that the user has frequently accessed these types of documents in the past and the user may need to access these same types of documents again in the future.

If the document access apparatus determines that the documents do correspond to user interface (S1103, yes), then processing proceeds to S1104. If the document access apparatus determines that the documents do not correspond to a user interface (S1103, no), then the workflow ends.

In S1104, the document access apparatus offers the corresponding user interface for use by the user. That is, the document access apparatus informs the user, by means of a visual prompt for example, that the corresponding user interface is available, and queries the user as to whether the user would like to have access to the functionality of that user interface.

The document access apparatus then determines whether or not the user has accepted the offer to use the corresponding user interface (S1105). If the document access apparatus determines that the user has accepted the offer to use the corresponding user interface (S1105, yes), then the document access apparatus adds the user interface to the user access information of that user (S1106). With reference to the user access information depicted in FIG. 3, the document access apparatus lists the corresponding user interface (e.g. 'legal' or 'scientific') in the user interface information of the respective registered user. The document access apparatus may alternatively, or in addition, amend the business relevancy information of the respective registered user in a similar manner.

If the document access apparatus determines that the user has not accepted the offer to use the corresponding user interface (S1105, no), then the workflow ends.

While the example shown in FIG. 2 (and similarly FIG. 7) includes one document management apparatus 25, one document access apparatus 27 and four client terminals 12-1 through 12-4, it should be appreciated that such numbers of systems, interfaces, apparatuses and terminals are arbitrary and are selected as an example in order to facilitate discussion, and that the subject matter of this disclosure can be implemented in a system including one or more systems, interfaces, apparatuses and terminals. Further, it is noted that a document management apparatus, document access apparatus and terminal can be included in one integrated device (or of course can be separate devices). Other devices, such as scanners, printers and multi-function devices (MFDs) may also be connected to the network 11, as is well known in the art.

Each of the client terminals 12-1 through 12-4 can be any computing device, including but not limited to a personal, notebook or workstation computer, a kiosk, a PDA (personal digital assistant), a MFD (multi-function device), a server, a mobile phone or handset, another information terminal, etc., that can communicate through the network 11 with other devices.

While four client terminals 12-1 through 12-4 are depicted in each of FIG. 2, it should be understood that system 200 can include any number of client terminals (which can have similar or different configurations) connected to the network 11.

The document access apparatus 27 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the network 11 with other devices.

The document access apparatus 27 of this disclosure may be realized by a computer program product including a computer-usable, non-transient medium (such as a disk storage apparatus) having instructions embodied therein that are executed by a computer.

Thus, it should be understood that document access apparatus 27 may be executed on a computer. While document access apparatus 27 is shown as being external to the client terminals 12-1 through 12-4, the document access apparatus 27 may in fact be executed on one of the client terminals 12-1 through 12-4.

The document store 75b can comprise one or more structural or functional parts that have or support a storage function. For example, the document store 75b can be, or can be a component of, a source of electronic data, such as a web server, a backend server connected to a web server, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 12:
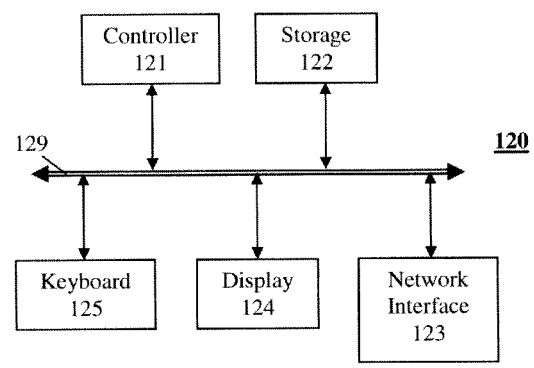
FIG. 12 shows a block diagram of an exemplary configuration of a document access apparatus (or application user interface apparatus)

FIG. 12 shows an exemplary constitution of a document access apparatus 120 (or a computer or server, for example) that can be configured through software to provide the document access apparatus 27 of FIG. 2. As shown in FIG. 12, the document access apparatus 20 includes a controller (or central processing unit) 121 that communicates with a number of other components, including memory or storage part 122, network interface 123, display 124 and keyboard 125, by way of a system bus 129.

The document access apparatus 120 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated to those skilled in the relevant arts.

In document access apparatus 120, the controller 121 executes program code instructions that control conferencing apparatus operations. The controller 121, memory/storage 122, network interface 123, display 124 and keyboard 125 are conventional, and therefore in order to avoid occluding the inventive aspects of this disclosure, such conventional aspects are not discussed in detail herein.

The document access apparatus 120 includes the network interface 123 for communications through a network, such as communications through the network 11 with the client terminals 12-1 through 12-4 and document management apparatus 25 in FIG. 2. However, it should be appreciated that the subject matter of this disclosure is not limited to such configuration. For example, the document access apparatus may communicate with the client terminals 12-1 through 12-4 and document management apparatus 25 through direct connections and/or through a network to which some components are not connected. As another example, the document access apparatus need not be provided by a server that services terminals, but rather may communicate with the terminals on a peer basis, or in another fashion.

As mentioned above, document access apparatus 27 is not limited to a server or computer, but can be manifested in any of various devices that can be configured to communicate over a network and/or the Internet.

Note that one or more of the user interfaces may be provided as web services through the network to the client terminal.

Figure 13:
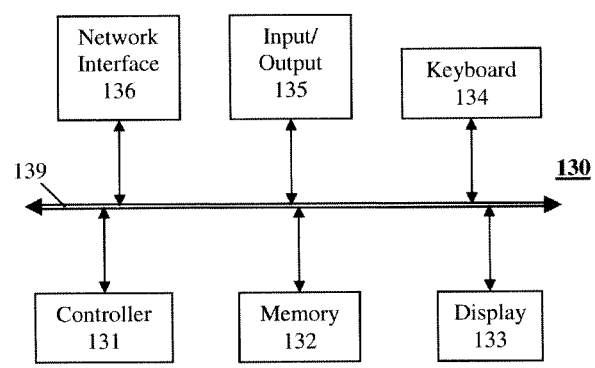
FIG. 13 shows a block diagram of an exemplary configuration of a client terminal.

An example of a configuration of one of the plurality of client terminals 12-1 through 12-4 (for example, as a computer) is shown schematically in FIG. 13. In FIG. 13, computer 130 includes a controller (or central processing unit) 131 that communicates with a number of other components, including memory 132, display 133, keyboard (and/or keypad) 134, other input/output (such as mouse, touchpad, stylus, microphone and/or speaker with voice/speech interface and/or recognition software, etc.) 135, and network interface 136, by way of internal bus 139.

The memory 132 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 136 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the client terminal and/or via the network, interact with network-connected devices and services (such as the document management apparatus 25), enjoy other software-driven functionalities, etc. For example, a browser (such as Internet Explorer™, Netscape Navigator™, a proprietary browser, etc.) may be provided on the client terminal so that a user of the client terminal can use browsing operations to communicate with the document management apparatus 25, and access other data or content.

Additional aspects or components of the computer 130 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, each of the client terminals 12-1 through 12-4 is not limited to a personal computer, but can be manifested in a form of any of various devices that can be configured to communicate over a network and/or the Internet.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A document access apparatus for streamlining access to a document management application in a document management system, said document access apparatus comprising:

a user information maintenance part configured to maintain user access information for a plurality of registered users, access to the document management application being customized for each particular user of the plurality of registered users, the user access information for the particular user including user interface information registering plural application functionalities that are presented to the particular user via a user interface, presentation of the plural application functionalities via the user interface being customized for the particular user; and a user interface part configured to receive user information from login of a specific user of a client terminal, utilize the user information to retrieve the user interface information registered for the specific user, and provide the user interface including the plural application functionalities registered for the specific user, for display on the client terminal, wherein the plural application functionalities for the specific user to access the document management application are different from functionalities provided through user interfaces customized for other respective users amongst the plurality of registered users.

2. The document access apparatus of claim 1, wherein said user interface provided for display on the client terminal includes an application interface part configured to communicate, when user input is received through the user interface, with an application program interface of the document management application, and send a command, corresponding to the user input and acceptable to the document management application, to the document management application to access one or more corresponding application functionalities of the document management application, corresponding to the user input.

3. The document access apparatus of claim 2, wherein said application interface part receives, in response to the command transmitted from the application interface part to the document management application, at least one of document and other information from the application program interface of the document management application, and said user interface provides said at least one of document and other information for access by the specific user.

4. The document access apparatus of claim 2, wherein said application interface part communicates at least some of the user information from the login of the specific user to the document management application, and the document management application determines, based on the user information and access control information maintained by the document management application, documents and other information which the user is permitted to access.

5. The document access apparatus of claim 1, wherein said user interface is provided as a web service through the network to the client terminal.

6. The document access apparatus of claim 1, wherein said document access apparatus is distinct from the document management application, and the document access apparatus is configured for modification without taking the document management application offline.

7. The document access apparatus of claim 1, wherein said user interface provided for display on the client terminal includes one or more user interface activators configured to transmit, when the activator is selected or activated by the user, a corresponding command to the document management application to access one or more corresponding application functionalities of the document management application.

8. The document access apparatus of claim 1, wherein the user access information maintained by said user information maintenance part for said each one of the plurality of registered users further includes business relevancy information indicating a specific business relevancy field pertinent to the registered user, and said user interface provided for display on the client terminal displays information corresponding to the specific business relevancy field pertinent to the specific user.

9. The document access apparatus of claim 8, wherein said user interface provided for display on the client terminal includes one or more user interface activators to access application functionalities corresponding to the specific business relevancy field pertinent to the specific user.

10. A system for providing document management services on a client terminal, said system comprising:
a document management apparatus configured to execute a document management application that includes
a plurality of application functionalities, including a document registration function to register a specified document in a document database, and a search function to search the document database based on specified terms, and
an application program interface configured to specify a format of communication with the document management application; and
an application user interface apparatus configured to communicate through a network with the document management application, the application user interface apparatus including a user interface part configured to maintain user access information for a plurality of registered users, access to specified documents registered in the document database being customized for each particular user of the plurality of registered users, the user access information for said particular user including user interface information registering plural application functionalities that are presented to the particular user via a user interface, presentation of the plural application functionalities via the user interface being customized for the particular user, and configured to provide a login interface through the network to the client terminal, receive user information from login of a specific user of the client terminal, utilize the user information to retrieve the user interface information registered for the specific user, and provide the user interface including the plural application functionalities registered for the specific user, for display on the client terminal,
wherein the plural application functionalities for the specific user to access the document management application are different from functionalities provided through user interfaces customized for other respective users amongst the plurality of registered users.

11. The system of claim 10, wherein said user interface part is further configured to communicate, when user input is received through the user interface, with the application program interface of the document management application, receive information from the application program interface specifying the format of communication with the document management application, and send a command, corresponding to the user input and in the format specified by the application program interface, to the document management application to access one or more corresponding application functionalities of the document management application, corresponding to the user input.

12. The system of claim 11, wherein said user interface part receives, in response to the command transmitted to the document management application, at least one of document and other information from the document management application, and provides said at least one of document and other information for access by the specific user on the client terminal.

13. The system of claim 10, wherein said user interface part communicates at least some of the user information from the login of the specific user to the document management application, and the document management application determines, based on the user information and access control information maintained by the document management application, documents and other information which the user is permitted to access.

14. The system of claim 10, wherein said application user interface apparatus is distinct from the document management application, and the application user interface apparatus is configured for reconfiguration without taking the document management application offline.

15. A method for providing document management services to a client terminal over a network, said method comprising the steps of:
(a) registering, by a document management apparatus, a plurality of documents in a document database;
(b) maintaining, by an application user interface apparatus configured for access to a document management application, user access information for a plurality of registered users, access to the plurality of documents in the document database being customized for each particular user of the plurality of registered users, the user access information for the particular user including user interface information registering plural application functionalities that are presented to the particular user via a user interface, presentation of the plural application functionalities via the user interface being customized for the registered user;
(c) providing, by the application user interface apparatus, a login interface through the network to the client terminal, receiving user information during login of a specific user, and utilizing the user information to retrieve the user interface information registered for the specific user; and
(d) providing the user interface including the plural application functionalities registered for the specific user, for display on the client terminal,
wherein the plural application functionalities for the specific user to access the document management application are different from functionalities provided through user interfaces customized for other respective users amongst the plurality of registered users.

16. The method of claim 15, wherein said user interface is provided in step (d) as a web service through the network to the client terminal.

17. The method of claim 16, wherein when user input is received through the user interface, the corresponding web service communicates with an application program interface of the document management application, receives information from the application program interface specifying the format of communication with the document management application, and sends a command, corresponding to the user input and in the format specified by the application program interface, to the document management application to access one or more corresponding application functionalities of the document management application, corresponding to the user input.

18. The method of claim 15, further comprising maintaining said plurality of user interfaces in a manner separate and distinct from the document management application, and allowing the plurality of user interfaces to be modified or reconfigured without taking the document management application offline.

19. A system for providing document management services to a terminal over a network, said system comprising:
a first server configured to execute a document management application having an application program interface and a plurality of application functions, the plurality of application functions including a document registration function to register a specified document in a document database, and a search function to search the document database based on specified terms;

a second server separated from the first server by a network, the second server including a user interface part configured to communicate through the network with the application program interface of said document management application, and a user information maintenance part configured to maintain user access information for a plurality of registered users, access to specified documents registered in the document database being customized for each particular user of the plurality of registered users, the user access information for the particular user including user interface information registering plural application functionalities that are presented to the particular user via a user interface, presentation of the plural application functionalities via the user interface being customized for the particular user, wherein the plural application functionalities for the specific user to access the document management application are different from functionalities provided through user interfaces customized for other respective users amongst the plurality of registered users.

20. The system of claim 19, wherein said first server is physically distinct from said second server.

* * * * *